United States Patent

[11] 3,618,838

[72] Inventors Stanley R. Schieven
Webster;
Gerald A. Sampson, Penfield, both of N.Y.
[21] Appl. No. 874,324
[22] Filed Nov. 5, 1969
[45] Patented Nov. 9, 1971
[73] Assignee Eastman Kodak Company
Rochester, N.Y.

[54] VACUUM TRUCK SYSTEM
10 Claims, 11 Drawing Figs.
[52] U.S. Cl.................................................. 226/95,
104/167, 198/129
[51] Int. Cl...................................................... B65h 17/28
[50] Field of Search........................................ 226/95,
170, 173; 104/166, 167, 162; 93/93; 271/68;
254/134.5; 198/129

[56] References Cited
UNITED STATES PATENTS
2,789,683   4/1957   Stahl .......................... 104/167 X
3,236,162   2/1966   Reist ........................... 271/68 X Primary Examiner—Allen N. Knowles
Assistant Examiner—Gene A. Church
Attorneys—William T. French, Robert F. Crocker and Karl T. Naramore ABSTRACT: An endless conveyor mechanism for holding one or more webs and/or other parts on a rigid surface while they are conveyed along a rectilinear path comprises a plurality of rigid truck members arranged to move in a closed path one portion of which is the rectilinear path through which the web or other parts are to be moved, and means for moving said trucks so that during the time they are moving in said trucks so that during the time they are moving in said rectilinear path they are held in abutment so that their web-supporting surfaces combine to form, in effect, a single rigid surface on which the web or other parts are held by vacuum as they are moved through said path.

The driving mechanism for the truck members brings the trucks into tight abutment at the beginning of the rectilinear path, then advances said trucks in butted relation through said path at a controlled rate, while at the same time accommodating for slight tolerances in individual truck dimensions, and then controls the movement of the trucks into the return portion of their path in such a way as to prevent them from bumping together and becoming damaged.

PATENTED NOV 9 1971

STANLEY R. SCHIEVEN
GERALD A. SAMPSON
INVENTORS

BY
ATTORNEYS

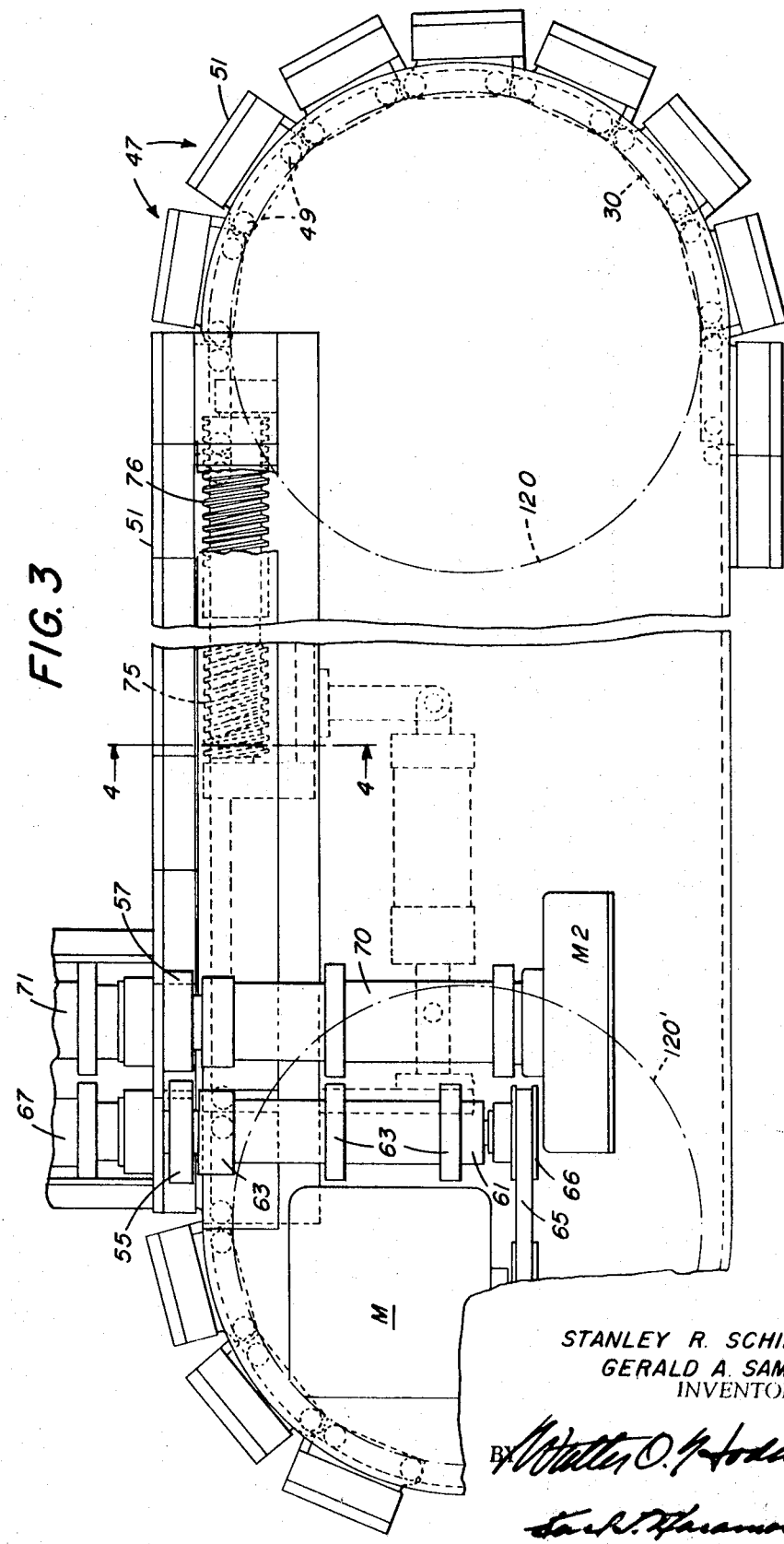

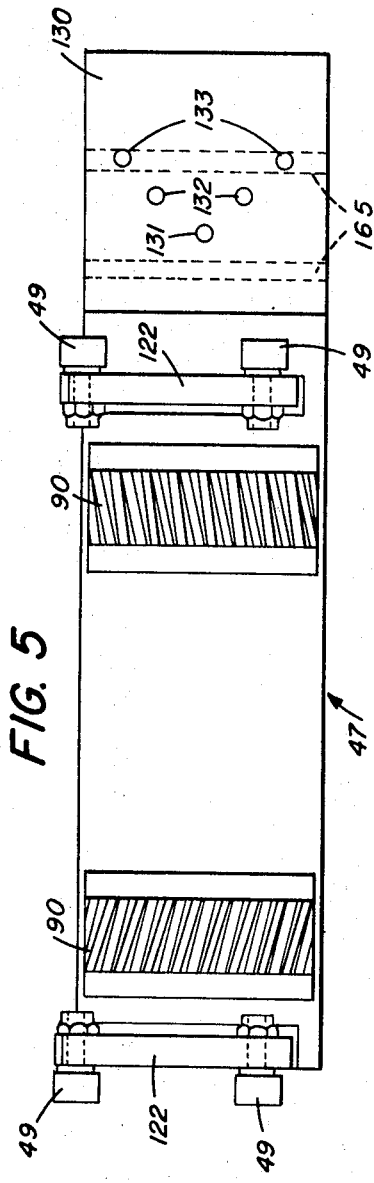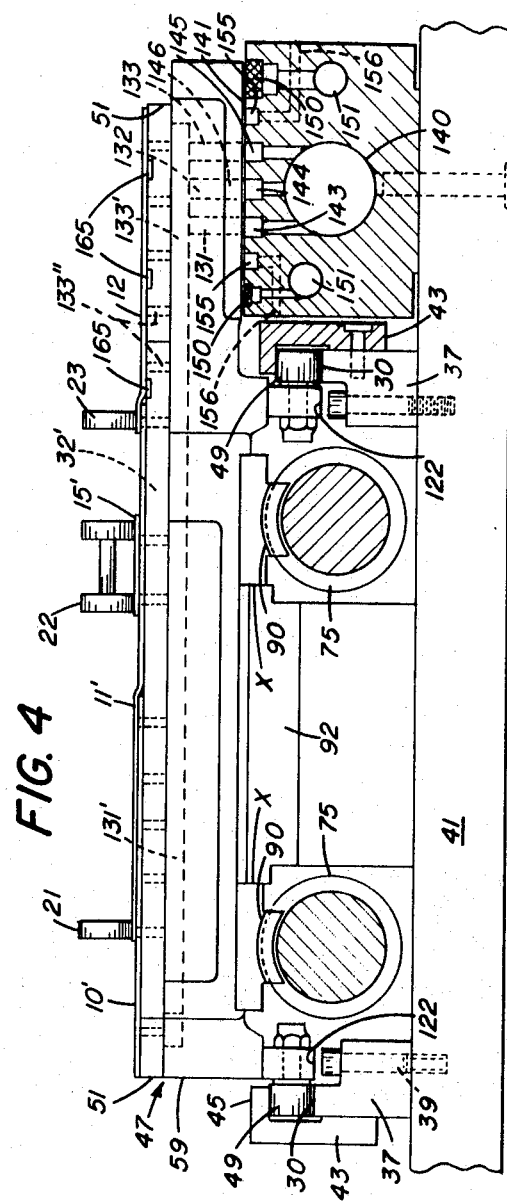

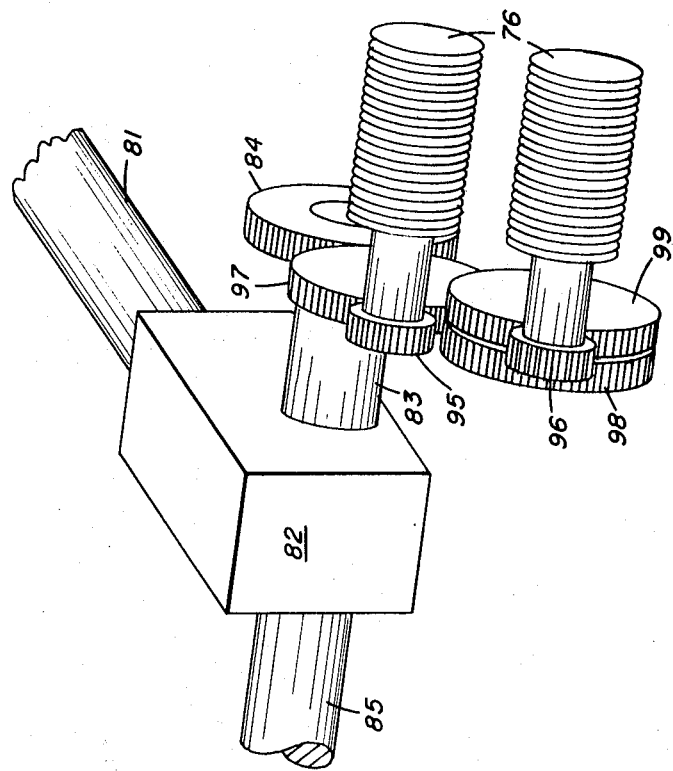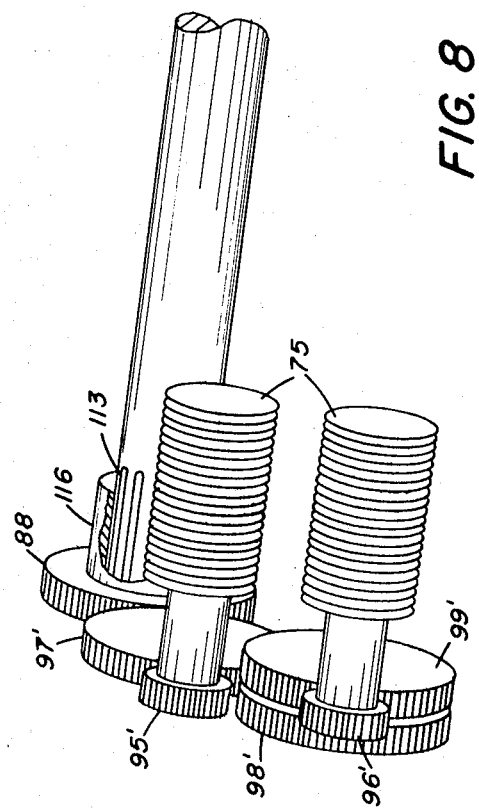
FIG. 8

STANLEY R. SCHIEVEN
GERALD A. SAMPSON
INVENTORS

ATTORNEYS

VACUUM TRUCK SYSTEM

The present invention relates to an endless conveyor mechanism, and particularly to a vacuum conveyor mechanism for continuously conveying a web, or two or more webs and/or other discrete elements along a rectilinear path at a controlled rate of speed while holding them on a rigid surface in predetermined overlying relation.

Endless perforated belts sliding over a stationary vacuum manifold have been used for feeding a web and other materials individually in a flat condition through a rectilinear path of limited length. However, belt conveyors of this type involve problems relating to friction, dusting and stretching, particularly in situations where the plane of movement is substantially long so that relatively long belts are required. A vacuum drum is another well-known way of conveying a web, or webs, but it has the disadvantage of differential length when conveying overlying webs and is not compatible with associated apparatus which requires that the webs be supported flatwise in a plane during conveyance through a certain portion of their path of movement. Also, a vacuum drum is not satisfactory for conveying discrete articles which are flat and cannot be bent to conform to the drum surface.

The primary object of the present invention is to provide a vacuum conveyor mechanism having the capabilities of known endless belt systems so far as feeding a web or other materials in a rectilinear path, but having none of the above-noted disadvantages thereof.

Another object is to provide a conveyor mechanism of the type set forth wherein the conveyor path comprises a plurality of rigid truck members arranged to move in a closed path one portion of which is the rectilinear path through which the web or other materials are to be moved, and means for moving said trucks so that during the time they are moving in said rectilinear path they are held in abutment so that their web-supporting surfaces combine to form, in effect, a single rigid surface on which the web or other materials are held by vacuum as they are moved through said path.

A further object is to provide a conveyor mechanism of the type set forth including a driving mechanism for the truck members which brings the trucks into tight abutment at the beginning of the rectilinear path through which the articles are to be fed, then advances said trucks in butted relation through said path at a controlled rate, while at the same time accommodating for slight tolerances in the individual truck dimensions, and then controls the movement of the trucks into the return portion of their path in such a way as to prevent them from bumping together and becoming damaged.

A still further object is to provide a conveyor mechanism of the type set forth including means for keeping the vacuum-porting region between the stationary vacuum manifold and the individual trucks free of dust particles.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings in which:

FIG. 3 is a front elevation of a vacuum truck system constructed in accordance with a preferred embodiment of the present invention;

FIG. 4 is an enlarged transverse sectional view taken substantially on line 4—4 of FIG. 3;

FIG. 5 is a bottom plan view of one of the vacuum trucks;

FIG. 8 is an isometric view, on an enlarged scale, of the gear drives for the metering screws;

Figure 1:
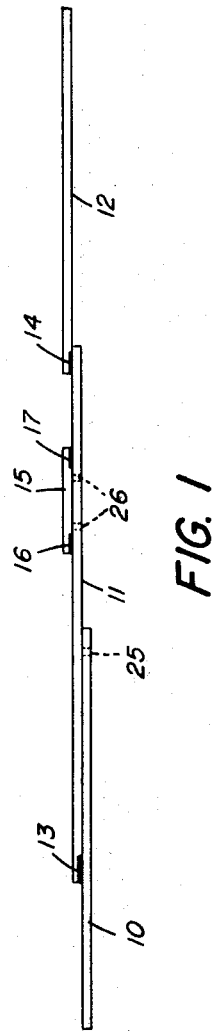
FIG. 1 is a side elevational view of a representative composite part which can be assembled on the present endless vacuum conveyor system.

While this vacuum conveyor mechanism was developed primarily for assembling a plurality of webs and discrete pieces together on a continuous motion assembly machine, and will be described in this capacity for disclosure purposes, it will be obvious that its usefulness is not limited to such an application. It is necessary that the various webs and/or pieces be assembled in nearly perfect registration. This requires that the position and speed of each web and/or piece be well controlled and it is necessary, or desirable, that the length of all webs be equal.

In this invention an appropriate number of individual elements, referred to hereinafter as trucks, are forced to travel in a prescribed closed path. This is accomplished by having followers attached to each truck engage with a cam path. The path is such that a top straight section of suitable length is established through which the webs and/or pieces are to be moved at a controlled rate of speed while being supported on the surface of a plurality of the trucks. A semicircular section at each end of the top straight section connects to a lower return path. This in effect defines an endless elongated loop.

A tendency drive located at the beginning of the top straight section forces each truck into butted relationship to the one immediately ahead of it. Two counterrotating screws are located near the downstream end of the top straight section and partial nuts are attached to the underside of each truck. As each truck reaches the end of the top section the partial nuts engage with the screws. Thus, the screws serve as a metering device for the truck system across the straight top section.

In the event the number and weight of the trucks between the tendency drive and the metering screws is too great for the tendency drive to adequately handle, then a second pair of metering screws, driven at the same rate of speed as the first-mentioned pair, may be located closer to the tendency drive to positively feed the trucks to the first-mentioned pair of metering screws. This second pair of metering screws will be mounted to move to and from the first-mentioned pair of metering screws in the direction of movement of the trucks and will be biased toward said first-mentioned pair of metering screws to accommodate for any slight dimensional tolerances in the individual trucks. As each truck leaves the metering unit, or the top straight section, it engages with a pair of driven wheels which press against the underside of the truck forcing them against the outer face of the semicircular cam path section. In this manner, the trucks are held in spaced-apart relation and kept from rolling freely downward to the return section and banging together and becoming damaged. Similar driven wheels are used at the end of the return section to carry each truck up to the top straight section and into engagement with the tendency drive.

Vacuum is used to assure retention of individually applied webs or other parts and to prevent them from slipping on the trucks and relative to each other as they move across the top straight section. To this end it is desired that vacuum be applied to different regions of the top surface or bed of the trucks at different times and for different intervals of time as the trucks move along the top straight section. Two or more porting holes are laterally spaced through the lower face (called the porting face) of each truck. Each of these holes is connected by appropriate coring to a different region of the bed of each truck. A stationary vacuum manifold is located so that the porting faces of the trucks move in close proximity to the porting face of the manifold. Longitudinal slots in the porting face of the manifold are aligned with the porting holes in the trucks. Thus, as each truck moves along the top straight section, vacuum is applied to the various regions of the truck beds, the timing being controlled by the location and lengths of the slots in the porting face of the vacuum manifold.

The clearances between the porting faces of the trucks and the vacuum manifold is so close that if foreign particles, such as dust enters this space, damage may occur. Entry of such foreign particles into this region is prevented in the following manner. The porting faces of both the trucks and manifold are somewhat larger than required to accomplish the vacuum porting. In the region surrounding the vacuum slots on the vacuum manifold, means are provided to supply clean air under pressure in a quantity larger than that required to make up leakage into the porting area. This last-mentioned means comprises porous plastic inserts in a compressed-air plenum which essentially surrounds the vacuum slots in the manifold.

The function and utility of a conveyor mechanism constructed in accordance with the present invention will be more readily understood if the problem of assembling a particular composite part made up of a plurality of individual components joined together in a certain superposed relation is considered. Referring to FIG. 1, suppose the composite part to be assembled comprises a first rectangular sheet 10, a second rectangular sheet 11 overlapping sheet 10 and a third rectangular sheet 12 overlapping sheet 11. These three sheets are held in proper overlapping relation by heat seals 13 and 14. A narrow strip of material 15 extends across the top of sheet 11 and is fastened thereto by two heat seals 16 and 17. The formation of these heat seals depends upon the sheets being either coated with suitable heat activated adhesive, or depends upon the sheets themselves being composed of a thermoplastic material which will soften sufficiently to adhere to one another.

Figure 2:
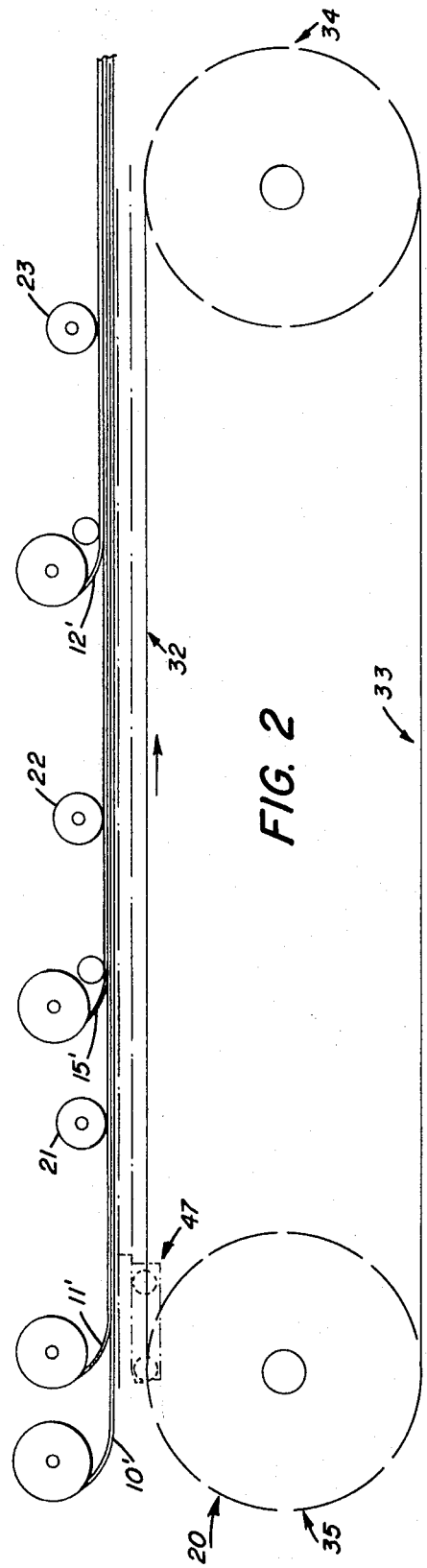
FIG. 2 is a schematic view showing how the present vacuum conveyor system is used to assemble a plurality of webs in a given superposed relation to form the composite part shown in FIG. 1.

A composite part of this type can be assembled continuously by bringing four continuous webs of material of the proper width into the desired overlapping relationship in succession and making the heat seals to hold them in the desired relation. As shown in FIG. 2, this may be done by feeding webs 10' and 11' from supply rolls in the desired overlapping relation onto the upper reach of an endless conveyor, indicated generally at 20, and moving to the right, looking at FIG. 2. After the webs 10' and 11' are fed onto the conveyor, they pass beneath a heat-sealing roller 21 which makes the seal 13. A continuous web 15' is then fed from a supply roll onto the top of the web 11' and the heat seals 16 and 17 are made by passing under a pair of transversely spaced heat seal rollers 22, only one of which is shown in FIG. 2 but both of which are shown in FIG. 4. Next, a web 12' is fed from a supply roll into overlapping relation with web 11' and the heat seal 14 is made as the webs pass under heat sealing roll 23. After the continuous strip of overlapping webs 10', 11', 12' and 15', leave the conveyor they may pass through a chopping mechanism, not shown, which successively chops the composite strips into composite parts of suitable width having a side elevation cross section like that shown in FIG. 1. It should be pointed out that instead of the strip of material 15, a discrete part could be applied to the top of sheet 11 by a single or double heat seal. This would necessitate replacing the roll of web material 15' in FIG. 2 with a hopper of discrete parts and from which hopper the discrete parts would be deposited on the top of web 11' at specified intervals and be heat sealed in place by passing under sealing rollers 22.

It will be understood that the assembly of a plurality of webs and/or discrete parts in the manner described requires a conveyor which will serve to convey the several parts continuously and at a given rate of speed over a rectilinear path of considerable length. Also, the conveyor must hold the parts in a predetermined superposed relation until they are sealed together, and it must support the parts on a rigid surface so that the necessary operations, e.g., sealing, can be performed on the webs. Using the novel method of holding a plurality of parts in overlying relation on a given surface as described in copending application Ser. No. 841,888, filed July 15, 1969, a vacuum conveyor can be used to transport the webs 10', 11', 12', and 15' over a rectilinear path. In accordance with the invention disclosed in the above-noted application, the sheet 10 (FIG. 1) or the web 10' (FIG. 2) is provided with one or more holes 25 through which a vacuum applied to the lower face of sheet 10, or web 10' can act to hold the sheet 11 or web 11' in place on top of the web 10' at least until the seal 13 is made. Likewise, the sheet 11, or web 11', is provided with a plurality of holes 26 extending thereacross through which a vacuum can act to hold the web 15' down onto the top of web 11'. As disclosed in the above-noted copending application, the holes 25 and 26 can be replaced by moon-shaped slits which will provide hinged flaps which will pull down upon the application of a vacuum and provide a hole through which the vacuum can act on the part above. In this instance the bed of the conveyor aligned with such moon-shaped slits would be recessed to allow the hinged flap to be pulled down out of the plane of its part by the vacuum.

Having thus set forth a particular assembly of parts which it is desired to perform in a continuous manner and at a known rate of speed, a vacuum conveyor mechanism constructed in accordance with a preferred embodiment of the present invention for accomplishing this end will now be described. Referring to FIGS. 2, 3, and 4, this conveyor mechanism comprises a pair of laterally spaced cam tracks 30 which define an endless path consisting of a substantially long, straight upper section 32 which is parallel to the rectilinear path along which the parts are to be conveyed, a return portion 33 which is below and parallel to the upper straight section 32, and two semicircular portions 34 and 35 connecting the upper and return portions. As shown in FIG. 4, each track 30 consists of a rail 37 fastened by bolts 39 to a support member 41 extending transversely beneath the tracks. Fixed to the outside face of each rail is a retainer member 43 having an inturned arm 45 spaced from the top of the rail to form therewith a channel.

An appropriate number of individual elements, referred to hereinafter as trucks 47, are forced to travel in the closed path defined by said cam tracks. To this end, each truck 47, which is rectangular in shape as shown, has four rollers 49 (FIG. 5) attached thereto which rotatably engage the tops of the rails 37. The retainer members 43 associated with the rails prevent the rollers from jumping off the rails. Each truck 47 has a flat top or bed 51 which extends across the tracks 30 by an amount such that they will define a portion of the rectilinear path through which the parts are to be conveyed as the trucks move along the straight upper section 32 of the cam tracks 30. As will be clear from FIGS. 4 and 11, the long dimension or length of each truck bed extends transversely of the conveyor path and is substantially equal to the length of the composite part to be assembled.

Figure 6:
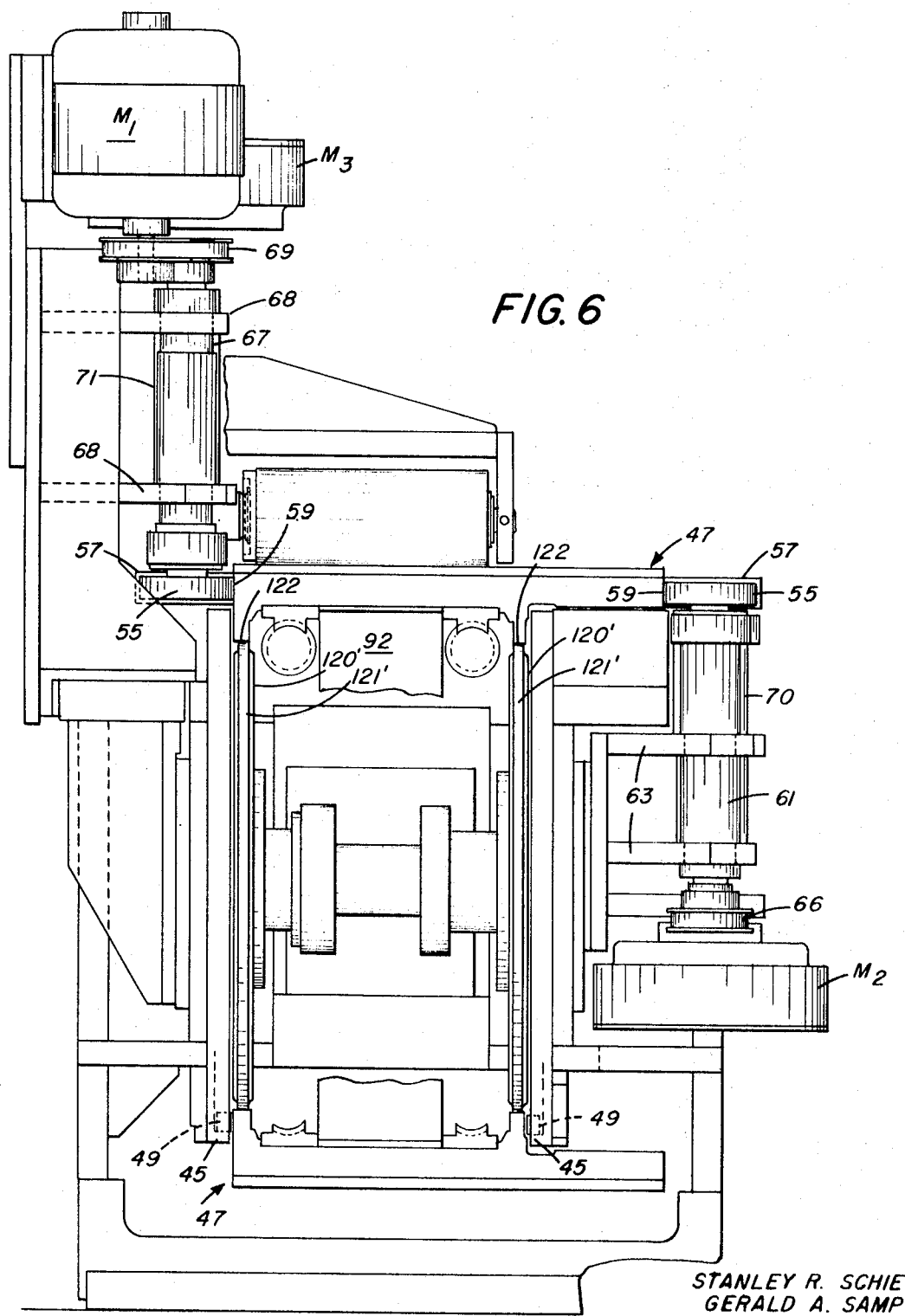
FIG. 6 is an end view of the vacuum truck system looking from the leading end thereof, and with the trucks rising from the return path to the leading end of the top straight section omitted for purposes of clarity.

A tendency drive located at the beginning of the top straight section of the cam tracks 30 forces each truck into butted relationship with the one immediately ahead of it. As clearly shown in FIGS. 3, 6 and 7, this tendency drive comprises two pairs of friction drive rolls 55 and 57 arranged in tandem at opposite sides of the conveyor to drivingly engage the vertical sidewalls 59 of each truck as it moves into the straight section. The drive roll 55 on the front side of the conveyor, the right side of FIG. 6 and the side shown in FIG. 3, is mounted on a vertical shaft 61 supported in bearings 63 and driven by a belt 65 from a motor M engaging pulley 66. For sake of clarity, the motor M and belt 65 have been omitted from FIG. 6. The drive roll 55 at the back of the conveyor is fixed to the end of a vertical shaft 67 supported in bearings 68 and driven by a belt 69 from a motor $M_1$. The drive roll 57 at the front of the conveyor is fixed to a vertical shaft 70 which is directly driven by a "pancake" type motor $M_2$. The companion drive roller 57 at the back of the conveyor is fixed to the end of vertical shaft 71 which is directly driven by a second "pancake" type motor $M_3$. The only reason why different types of motor drives are used for the two pairs of drive rolls 55 and 57 is because of the space limitations imposed by the proximity of vertical shafts on which these rolls are mounted.

The purpose of the first pair of drive rolls 55 is to engage each truck 47 as it reaches the beginning of the top straight section and move it into abutment with the truck immediately ahead of it so that the top surface or beds 51 of the trucks will in effect combine to form a single rigid surface as the trucks move along the straight section 32 of the conveyor. The purpose of the second pair of drive rolls 57 is to advance a series of trucks in butted relation until they are engaged by a positive metering drive which will be described hereinafter. This means that the drive rolls 57 must be capable of doing more work than drive rolls 55 since the rolls 57 may be pushing a plurality of trucks along the straight section, whereas drive rolls 55 are moving only one at a time. However, since driving rolls 55 must move each approaching truck into abutment with the one ahead of it before the trucks are engaged by drive rolls 57, this means drive rolls 55 should tend to drive each truck slightly faster than they will be driven by drive rolls 57. To achieve these two ends the drive rolls 57 have a wider driving face than the drive rolls 55, thus giving them more driving power, and the motor drives to drive rolls 55 is preferably made slightly faster than those to the drive rolls 57.

Figure 7:
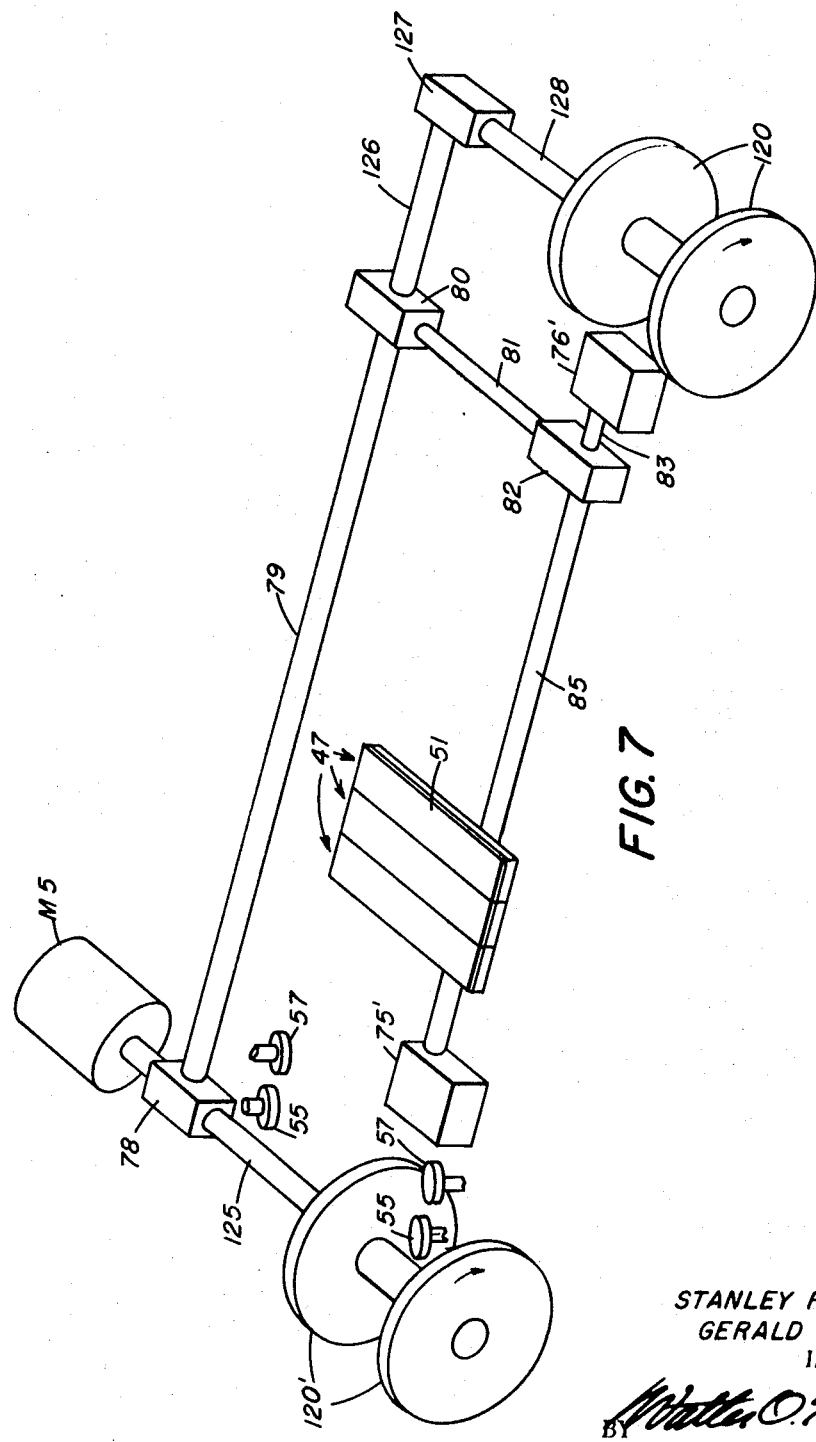
FIG. 7 is an isometric schematic view of the drive mechanism for the different driving elements of the vacuum truck system.

Two pairs of counterrotating driving screws 75 and 76 are coaxially located in tandem downstream of the tendency drive rolls 55 and 57. Each pair of screws 75 and 76 has the same thread pitch and are driven at the same speed by a suitable drive means. As shown in FIGS. 7 and 8, this drive means may comprise a motor $M_5$ connected through a gear box 78 to a drive shaft 79 which is in turn connected through a gearbox 80 to a second drive shaft 81. Through another gearbox 82 shaft 81 is connected to a shaft 83, on which the drive gear 84 for the pair of screws 76 is located, and is also connected to another drive shaft 85 on which the drive gear 88 for the pair of screws 75 is located, see FIG. 8. The gear drives for the two pairs of screws 75 and 76 is very similar and will be described in detail hereinafter. In FIG. 7 these gear drives are shown merely as boxes 75' and 76' because of the small scale of this FIG. At this point it will suffice to say that the gearing between each pair of drivescrews and the motor $M_5$ is such that they will be rotated at the same speed and their speed of rotation in conjunction with the pitch of their threads will determine the speed at which the trucks are moved along the straight section of the conveyor path.

Figure 10:
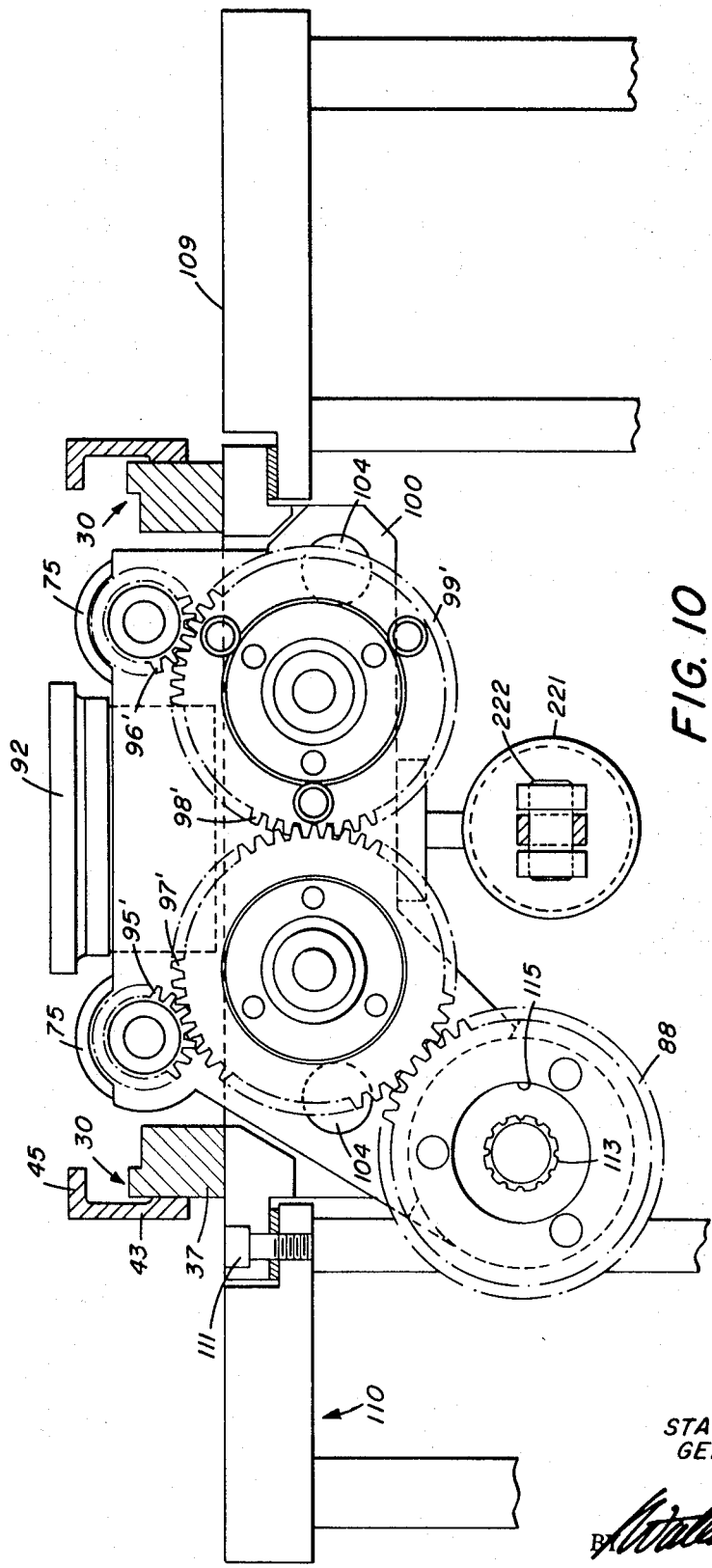
FIG. 10 is an end view of the leading metering screws and their drives taken substantially on line 10—10 of FIG. 9.

A pair of partial nuts 90 are attached to the outside of each truck in any suitable manner, e.g., by welding, and have threads which are complimentary to those of the screws 75 and 76, see FIGS. 4 and 5. As each truck 47 reaches the first pair of screws 75 the partial nuts engage with the screws so that from thereon the trucks are fed positively along the top straight section 32 at a continuous rate determined by the speed of rotation of the screws and the pitch of their threads. It is for this reason that it is imperative that the tendency drive rollers 55 and 57 bring the trucks into butted relation before, and hold them in such relation up until the time that, the trucks are positively meshed with the driving screws 75. It will thus be seen that the drivescrews 75 and 76, along with the partial nuts on each truck, serve as a metering device for that portion of the truck system moving along the top straight section 32 of the conveyor path. As shown in FIGS. 4 and 10, a stationary guide member 92 extends longitudinally of the top straight section and the inside edges of the partial nuts 90 on each truck engage the longitudinal edges of this guide member, as shown at X in FIG. 4, to maintain the trucks in a given path as they move along the top straight section of the conveyor path.

For the most part, the gear drives for the two pairs of metering screws 75 and 76 are alike and differ primarily in that the screws 75 are mounted to move axially toward and from the screws 76 to accommodate for slight manufacturing tolerances in the width of the individual trucks as will be hereinafter described. Referring to FIG. 8, the gear drive for the screws 76 will be described. Although not shown in detail, the screws 76 are rotatably mounted in fixed bearings and one screw has a small gear 95 fixed to the end of a shaft thereon, while the other has a like small gear 96 fixed to the end of a shaft thereon. Small gear 95 is driven from drive gear 84 through a first intermediate gear 97 which in turn drives a second intermediate gear 98 corresponding to gear 97. Coaxially arranged relative to, and adjustably connected to, gear 98 is a third gear 99 which drives the small gear 96 at the same speed as the small gear 95 but in an opposite direction. The double gear arrangement 98 and 99 is used to permit a limited arcuate adjustment of the two relative to one another for the purpose of timing the two screws 76, and after which adjustment the two are pinned together to rotate as one. Since such timing adjustments of coaxial gears are well known, the details of the structure permitting such adjustment has not been illustrated.

Coming now to the gear drive for the pair of screws 75, it will be seen that it is essentially the same as that for screws 76 and includes intermediate gear 97' driven from drive gear 88 which is the same size as drive gear 84 and driven by shaft 85 at the same speed and in the same direction as the drive gear 84. As before, intermediate gear 97' drives a small gear 95' fixed to one of the screws 75 and also drives a second intermediate gear 98' adjustably connected to a like coaxial gear 99' which drives the second screw 75 through the small gear 96'. The corresponding gears of the drives for the two pairs of screws 75 and 76 are of the same size and are driven in the same direction. They are in fact all helical gears for the purpose of providing a smooth drive, although they have been illustrated as spur gears for purposes of clarity and simplicity.

If the distance between the tendency drive rolls 55 and 57 and the second set of metering screws 76 is not so great that the number of trucks 47 accumulating between these two drives does not overload the tendency drive then there is really no need for the first pair of drivescrews 75. However, where the length of the top straight section of the conveyor is required to be so long that as many as 20 or 30 trucks 47 might accumulate between the tendency drive and the second pair of screws it has been found that the weight of the trucks that the tendency drive must push along in butted relation before they become engaged by the metering screws 76 may induce a load on the tendency drive so great that it will fail to keep the trucks butted up to the time they engage the metering screws 76. For this reason the second set of metering screws 75 have been provided close to the tendency drive. Since the number of trucks 47 accumulating between the two sets of metering screws 75 and 76 is significant, and the widths of the individual trucks may vary from a given value despite the most rigid manufacturing specifications, some means must be provided to accommodate for a tolerance variation in the truck widths in order that the partial nuts 90 on a series of trucks along the top straight portion will properly engage the two sets of screws 75 and 76 at the same time. For example, if each truck width was only 0.001 inch oversize, then if there were 30 trucks in the straight portion engaging the two sets of metering screws then the last truck engaging the metering screws 75 would be 0.030 inch out of phase with the lead thread of the metering screws 76 and would not properly engage it. To accommodate for such a condition, and to insure each truck properly engaging the lead thread of the first set of screws 75 and moving along both sets of screws without binding, the first set of screws 75 are mounted so as to be capable of a limited coaxial movement and are biased toward the second pair of screws 76.

Figure 9:
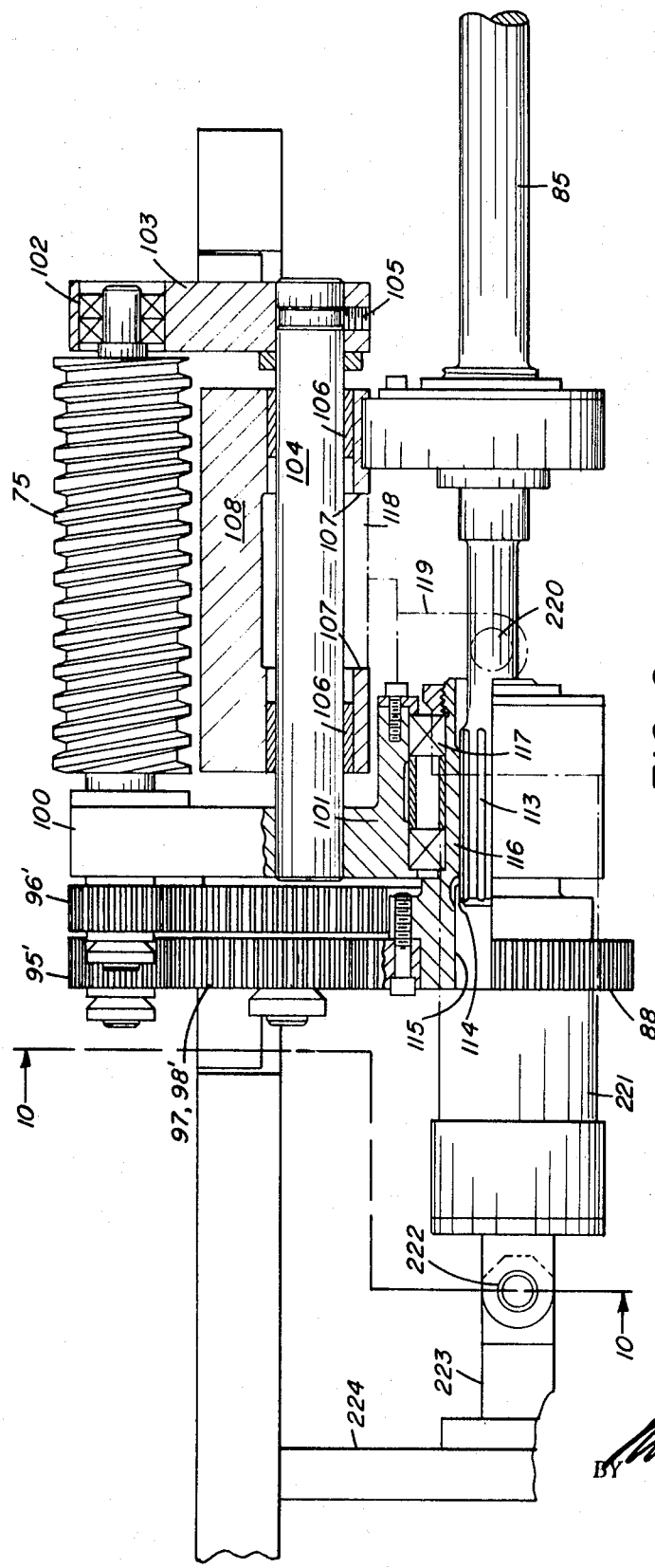
FIG. 9 is a side elevational view, partly in section, showing the floating mounting for the leading metering screws and their drives.

To this end the first pair of metering screws 75 and the drive gears 88, 95'-99' are mounted for limited axial movement as shown in FIGS. 8, 9 and 10. As shown in FIGS. 10 and 9, each of the gears 88, 95'-99' and the leading end of each of screws 75 are rotatably supported in the upright arm 100 of a bearing support 101. The rear ends of the screws 75 are journaled in bearings 102 carried by a second bearing support 103. The two bearing supports 101 and 103 are tied together by a pair of transversely spaced tie rods 104 fixed to each of the bearing supports, as by means of a set screw 105, as shown most clearly in FIG. 9. Tie rods 104 are slidably mounted in bushings 106 in arms 107 extending downwardly from a horizontal stationary supporting plate 108 attached to the horizontal top 109 of the frame 110 of the apparatus in any suitable manner, as by bolts 111. So that the drive from drive gear 88 to drive shaft 85 will be maintained during limited axial movement of the metering screws 75 and their associated drive gears, drive gear 88 is connected to shaft 85 through a spline 113 on the end of shaft 85 engaging internal teeth 114 formed in the wall of a bore 115 extending coaxially through the hub 116 on drive gear 88. The drive gear 88 is journaled in bearing support 101 by a bearing 117. Fixed to the underside of plate 118, and located intermediate the tie rods 104, is a downwardly extending clevis 119 to which is pivoted, at 220, to the end of a plunger of a double-acting air cylinder 221 whose other end is pivoted at 222 to a second clevis 223 fixed to a vertical leg 224 of the machine frame 110. It will be appreciated that this floating mount for the metering screws 75 and their gear drive provides for a limited axial movement thereof relative to the metering screws 76 which is sufficient to accommodate for any cumulative error in the spacing between the partial nuts of the row of trucks engaging the two sets of screws which might result from variations of the manufacturing tolerances in the widths of the individual trucks, and thereby insures a proper meshing between the nuts of the trucks and each set of metering screws at all times during the travel of a plurality of trucks across the top straight section of the conveyor path.

As each truck 47 leaves the metering screws 76, it engages with a pair of driven wheels 120. The wheels preferably have rubber tires 121, which press against surfaces 122 on the underside of each truck to force the rollers 49 on the truck against the inside face of inturned arm 45 of retainer member 43, see FIGS. 4 and 6. In this manner, the trucks are held in spaced-apart relationship as they move down the semicircular section 34 of the cam path and are prevented from rolling freely downward toward the return section of the path. Similar wheels 120' having rubber tires 121' are used at the end of the return section to carry each truck up to the top straight section. The trucks 47 are forced along the return section of the path in butted relation by wheels 120 frictionally engaging the truck just entering the return section. As shown in FIG. 7, each pair of wheels 120 and 120' are driven by the motor M₅ which is connected through gearbox 78 to shaft 125 on which wheels 120' are mounted, and is also connected through shaft 79, gearbox 80, shaft 126, gearbox 127 to a shaft 128 on which the wheels 120 are mounted. The pairs of wheels 120 and 120' are of the same size and the drive for them is such that they will be rotated in the same direction and at a rate commensurate with the rate at which the trucks are moved along the top straight section of the conveyor path.

As mentioned above, the several webs and/or other parts to be assembled are held by vacuum in proper superposed relation on the bed of the trucks 47 as they move along the top straight section of the conveyor path in butted relation. Referring again to FIGS. 1 and 2, it will be appreciated that in assembling the composite article used for purposes of illustration, vacuum must be applied to different regions of the truck beds at different times and for different intervals. For example, looking at FIG. 4, vacuum must be initially applied to the left-hand side of the bed of the trucks to hold the webs 10' and 11' in superposed relation on the trucks. Vacuum must be applied in this area from the time these two webs are deposited on the trucks and for an interval it takes for them to move under sealing roller 21 at which time these two webs are sealed together by seal 13, see FIG. 1. As the trucks 47 approach the point where the web 15' is layed down on top of web 11' vacuum must be applied to that region of the truck beds covered by web 15' and should be maintained long enough to hold this web in proper superposed relation with web 11' until sealing rollers 22 are passed and the web 15' is attached to the web 11' by seals 16 and 17. Thereafter, vacuum must be applied to that region of the truck beds on which web 12' is deposited, and should be maintained at least until sealing roller 23 is passed and web 12' is sealed at 14 to web 11'. To be sure that web 12' is sealed to web 11' in proper superposed relation, it might be desirable to hold either of the webs 10' or 11' or both, onto the truck by vacuum until web 12' is deposited and sealed to web 12'.

Figure 11:
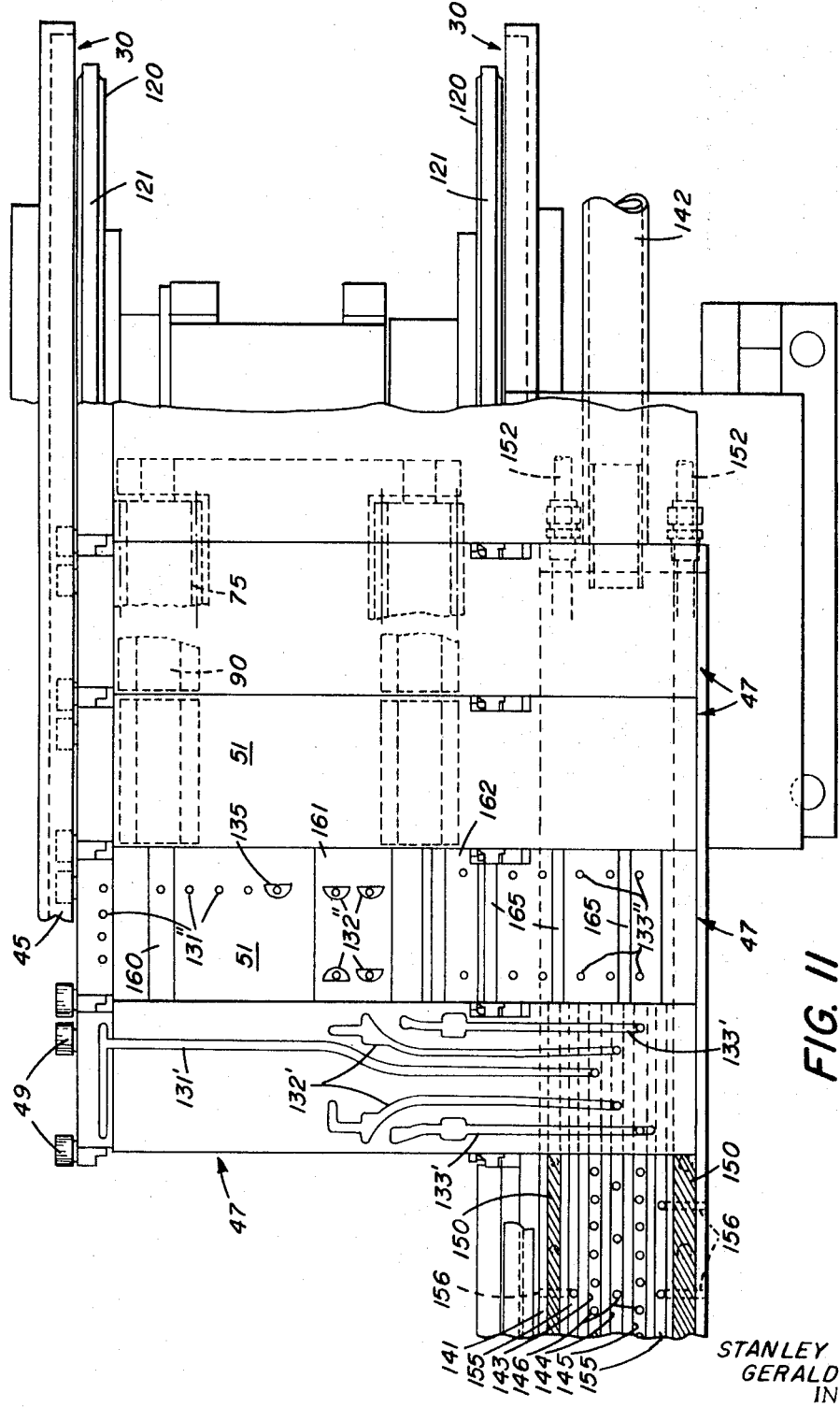
FIG. 11 is a partial top plan view of a portion of the top straight section of the vacuum truck system with certain trucks omitted and with the bed of one truck omitted, for the purposes of clarity.

For applying vacuum to different regions of the truck beds at different times and for selective intervals the following structure is used. The ends of the trucks facing the front of the conveyor, the right-hand ends thereof looking at FIG. 4, overhang or extend beyond, the front cam track 30. The lower face 130 of this extension of the trucks, called the porting face, is provided with two or more porting holes arranged in laterally spaced rows. As shown in FIGS. 4 and 5, the porting face 130 of each truck may have five porting holes, one of which is designated 131, two of which are designated 132, and the remaining two of which are designated 133. The two porting holes 133 are arranged in one row extending longitudinally of the top straight section of the conveyor path, the two porting holes 132 are arranged in another row laterally spaced from the row of holes 133, and hole 131 is laterally spaced from the row of holes 132. Each of these holes is connected by appropriate coring to a different area or region of the bed of the truck 47. To facilitate coring of the trucks 47, the bed 51 is made as a separate piece from the truck body and the truck face is routed out as shown in FIG. 11 where the left-hand truck 47 is shown with its bedplate removed and the adjacent truck 47 has the bedplate in place and shows the vacuum holes entering different regions thereof. Porting holes 133 are each connected with corings 133', porting holes 132 are each connected with corings 132', and porting hole 131' is connected with coring 131'.

Referring to FIG. 11, that portion of the truck beds 51 on which web 10' is to be deposited is provided with an L-shaped array of holes 131" extending therethrough and adapted to communicate with the coring 131'. The hole 131" nearest the center of the truck beds which is adapted to align with hole 25 in the web 11, (FIG. 1) so that vacuum can act through web 10' to hold the web 11' on top of the web 10', is shown embraced by a D-shaped depression 135. This depression is provided in the event the hole 25 in the web 10' takes the form of moon slit, as previously mentioned, so as to allow the hinged flap formed by the moon slit to be pulled out of the plane of the web and open the hole to allow vacuum to pass through web 10' and act to hold down web 11'.

That portion of the truck beds on which the narrow web 15' is to be deposited is provided with two longitudinally spaced rows of holes 132" communicating with the corings 132'. These holes align with holes 26 in the web 11 to hold the web 15 down on web 11 (see FIG. 1) and are shown embraced by D-shaped depressions in the event holes 26 in web 11 are in the form of moon slits as mentioned above.

That portion of the truck beds on which the web 12' is to be deposited is provided with two spaced rows of perforations 133" communicating with the corings 133' to hold the web 12' on the truck bed in overlapping relation with the end of web 11', see FIGS. 1 and 4.

A stationary vacuum manifold 140 extends almost the full length of the top straight portion 32 of the conveyor path and is located so that the porting faces 130 of the trucks move in close proximity to the porting face 141 of the manifold. The vacuum manifold is evacuated through a pipe 142 connected to a suitable exhaust fan, not shown. Three longitudinal slots 143, 144 and 145 are aligned with, and embrace, the porting holes 131, 132, and 133, respectively, in the porting faces of the trucks, and each of these slots is placed in communication with the interior of the vacuum manifold by a series of bores 146. Thus, as each truck moves along the straight top section 32 of the conveyor vacuum is applied to the various regions of the truck bed 51, the timing being controlled by the location and length of the different slots 143, 144, and 145 in the porting face of the vacuum manifold. In order to make this conveyor system readily adaptable to the assembly of different composite parts, rather than limited to the assembly of one particular one, the slots 143, 144, and 145 would initially be made to extend the full length of the manifold, and plugs, not shown, could be inserted into the different slots to vary the location and effective length of the slots to obtain any desired timing of the start and duration of the vacuum applied to the different regions of the truck beds.

The clearances between the porting faces 130 of the trucks 47 and the porting face 141 of the manifold must be very small, e.g. 0.0005-0.002 inch, in order to efficiently transmit the vacuum to the truck beds. If foreign particles such as dust, enters this space, damage to, or galling of, the porting face of the trucks and manifold may occur. Entry of such foreign particles into this region is prevented in the following manner. The porting faces 130 and 141 of the truck 47 and manifold 140, respectively, are somewhat larger than required to accomplish the vacuum porting. In the regions embracing the vacuum slots 143, 144, and 145 on the porting face 141 of the vacuum manifold, means are provided to supply clean air in a quantity larger than that required to make up leakage into the porting area. As shown, particularly in FIGS. 4 and 11, this means of supplying clean air is through porous plastic inserts 150 extending along the porting face 141 of the vacuum manifold in embracing relation to the vacuum slots 143, 144, and 145. Air under pressure is forced up to the porting face of the manifold through these porous plastic inserts 150 from compressed-air plenums 151 connected by pipelines 152 to a suitable air compressor means, not shown. To prevent the air entering the space between the porting faces of the trucks and the vacuum manifold from being drawn into the vacuum manifold, and thereby cutting down on the effectiveness of the vacuum applied to the truck beds, slots 155 extend longitudinally along the porting face 141 of the manifold between the porous plastic inserts 150 and the vacuum slots 143 and 145. These slots 155 are connected to the atmosphere through a plurality of right angle bores 156 so that any air exiting from the porous plastic inserts 150 which tends to be drawn into the vacuum manifold will first have an exit to the atmosphere through the slots 155 and their associated bores 156.

From the above description, it will be apparent that each truck 47 must be kept tightly butted against the preceding truck as the trucks move across the vacuum manifold 140, for otherwise vacuum leakage would occur and the vacuum holding power of the truck beds would be inefficient. This means that the longitudinal faces of the individual trucks 47 must be machined carefully so that they will mate accurately when brought into abutment. This also points up the importance of the tendency drive rolls 57 having sufficient driving power to bring each truck into tight abutment with the one ahead of it before the butted trucks are engaged by the first set of metering screws 75. After the trucks 47 are engaged by the metering screws 75, they will be maintained in tight abutment throughout their travel along the top straight portion of the conveyor by reason of the engagement of the screws 75 and 76 with the partial nuts 90 carried by each truck. Should the length of the top straight section be relatively short, so that there are not too many trucks 47 between the tendency drive and the second set of screws 76 to overload the tendency drive, then the first set of metering screws 75 could be eliminated as set forth above.

Should it be found necessary or desirable that the heat-sealing rollers 21, 22, and 23 work against a resilient surface in order to produce the heat seals 13, 14, 16, and 17, then the beds 51 of the trucks 47 could be recessed in these regions and have sheets of rubber, or other suitable resilient material, inserted in such recesses to be flush with the remainder of the top of the truck beds. In FIG. 11 such rubber inserts are shown on the second truck from the left, the one under sealing roll 21 being indicated as at 160, the one under sealing rolls 22 being indicated at 161, and the one under sealing roll 23 being indicated at 162. To facilitate removal of the assembled composite web from the truck beds as thy reach the end of the top straight portion of the conveyor, that end of the truck beds above the porting face 130 is provided with three laterally spaced grooves 165 (see FIGS. 4 and 11), into which stationary stripping fingers, not shown, located at the end of the straight portion might extend to strip the assembled composite web from the truck beds so that it can be fed further onto a windup station, or through a chopping station where it is chopped up into individual components of desired widths.

It is believed that from the above description it will be understood that this vacuum truck system meets all of the requirements of a conventional vacuum roll without possessing the limitations thereof. The main advantage of this vacuum truck system is the top straight line path feature with the ability to hold materials on a rigid surface by vacuum. This allows two or more continuous webs, or discrete parts, to be registered and sealed to each other without developing a differential length condition which will become apparent as a wrinkling of one web when the two are straightened out. Discrete parts which will not conform to an arcuate surface can be applied in registration with a web and be retained by vacuum until sealed in place by external means using this vacuum truck system, whereas such an operation would be difficult, if not impossible, using a vacuum roll of practical dimensions. In addition, this vacuum truck system is particularly suitable for continuous motion high-speed assembly machinery.

This invention has been described in detail with particular reference to a preferred embodiment thereof, but it will be understood that variations and modifications can be effected within the spirit and scope of the invention as described hereinabove as defined in the appended claims.

We claim:

1. A conveyor mechanism for continuous moving articles along a rectilinear path at a given rate of speed while supporting them on a rigid, flat surface comprising in combination:
    1. an endless track having a straight portion coextensive with and parallel to said rectilinear path;
    2. a plurality of trucks arranged in a row on said track and individually movable along said track, each truck having a flat bed arranged to define a portion of said rectilinear path as the trucks move along said straight portion of said track;
    3. means for driving said trucks around said track and including:
        a. first drive means at the leading end of said straight portion for forcing the bed of each truck into butted relation with the bed of the truck immediately ahead of it as the trucks move into said straight portion, and
        b. second drive means for advancing the trucks in butting relation along the length of said straight portion at said given rate of speed.

2. A conveyor mechanism as defined in claim 1, wherein said first drive means comprises a tendency drive which tends to drive said trucks faster than said given rate of speed, and wherein said second drive means comprises a positive drive engaging said trucks after they have been brought into butting relation and metering their rate of travel along the remainder of the straight portion of said track.

3. A conveyor mechanism as defined in claim 2 wherein said positive drive for the trucks comprises a rotatable metering screw extending along the straight portion of said track, and a threaded partial nut on each truck adapted to be brought into mating engagement with said screw after the trucks have been moved into butting relation by said tendency drive.

4. A conveyor mechanism as defined in claim 2 wherein said positive drive for the trucks comprises two like rotatable metering screws extending along the straight portion of said track in spaced coaxial relation adapted to be successively engaged by the threaded partial nuts on the trucks, means for mounting the metering screw nearest the beginning of the straight portion of the track for a limited axial movement relative to said other metering screw to allow the beds of the series of trucks between said two screws to be held in butting relation despite tolerable variations in the dimensions of said truck beds in the direction of their movement.

5. A conveyor mechanism according to claim 1 wherein said endless track includes a return section located vertically below said straight portion which is connected to the leaving end of said straight portion by an arcuate portion, and wherein said means for driving said trucks around said track includes a third drive means for moving said trucks through said arcuate portion in spaced relation and pushing said trucks along said return section with their beds in butted relation.

6. A conveyor mechanism according to claim 5 wherein said return section of the track is connected to the beginning of the straight portion thereof by a second arcuate portion, and wherein said means for driving said trucks around said track includes a fourth drive means for moving the trucks, as they reach the end of said return section, up said second arcuate portion to the beginning of said straight section.

7. A vacuum conveyor mechanism for moving two or more webs and/or discrete articles along a rectilinear path at a given rate of speed while holding them in a predetermined superimposed relation on a rigid, flat surface comprising in combination:
1. an endless track having a straight portion coextensive with and parallel to said rectilinear path;
2. a plurality of trucks supported in a row on said track and individually movable along said track, each truck including:
   a. a flat bed arranged to define a portion of said rectilinear path as the trucks move along said straight portion of said track;
3. means for driving said trucks around said track, and including:
   a. first drive means at the leading end of said straight portion for forcing the bed of each truck into butting relation with the bed of the truck immediately ahead of it, as the trucks move into said straight portion, to form a rigid, flat surface on which said webs and/or discrete articles are adapted to be deposited in sequence and in overlapping relation;
   b. second drive means for advancing the trucks in butting relation along the length of said straight portion at a given rate of speed; and
4. means for applying a vacuum to different areas of the truck beds at different intervals as the trucks move along said straight portion to hold the webs and/or discrete elements on the butted truck beds in the superimposed relation they are deposited thereon.

8. A vacuum conveyor mechanism as defined in claim 7 wherein said last-mentioned means includes:
1. a porting face in the bottom of each truck provided with an ($n$) number of porting holes laterally spaced relative to the direction of movement of said trucks;
2. different regions of the bed of each truck provided with holes;
3. conduits in each truck placing the holes common to a certain region of the bed in communication with a different one or group of said porting holes,
4. a stationary vacuum manifold below and parallel to said straight portion of the track and having a porting face in close proximity with which the porting faces of said trucks move as they move along said straight section,
5. an ($n$) number of elongated ports through the porting face of said manifold arranged so that each one thereof is aligned with a different one or group of the porting holes in the porting face of said trucks as the trucks move over the manifold, whereby the timing of the application of vacuum to the various regions of the truck beds is controlled by the location and length of the ports in the porting face of the vacuum manifold.

9. A vacuum conveyor mechanism as defined in claim 8, including means for preventing foreign particles from being drawn into the space between the porting faces of said trucks and said vacuum manifold by the vacuum in this space.

10. A vacuum conveyor mechanism as defined in claim 9, wherein said last-mentioned means includes means for supplying clean air under pressure to the regions bounding the ports in the porting face of said vacuum manifold in a quantity larger than that required to make up leakage into the porting area.

* * * * *